SE. HARVESTERS.
EXAMINERS ROO
C. H. McCormick.
Mower.
No. 578 Reissued Aug. 3. 1858
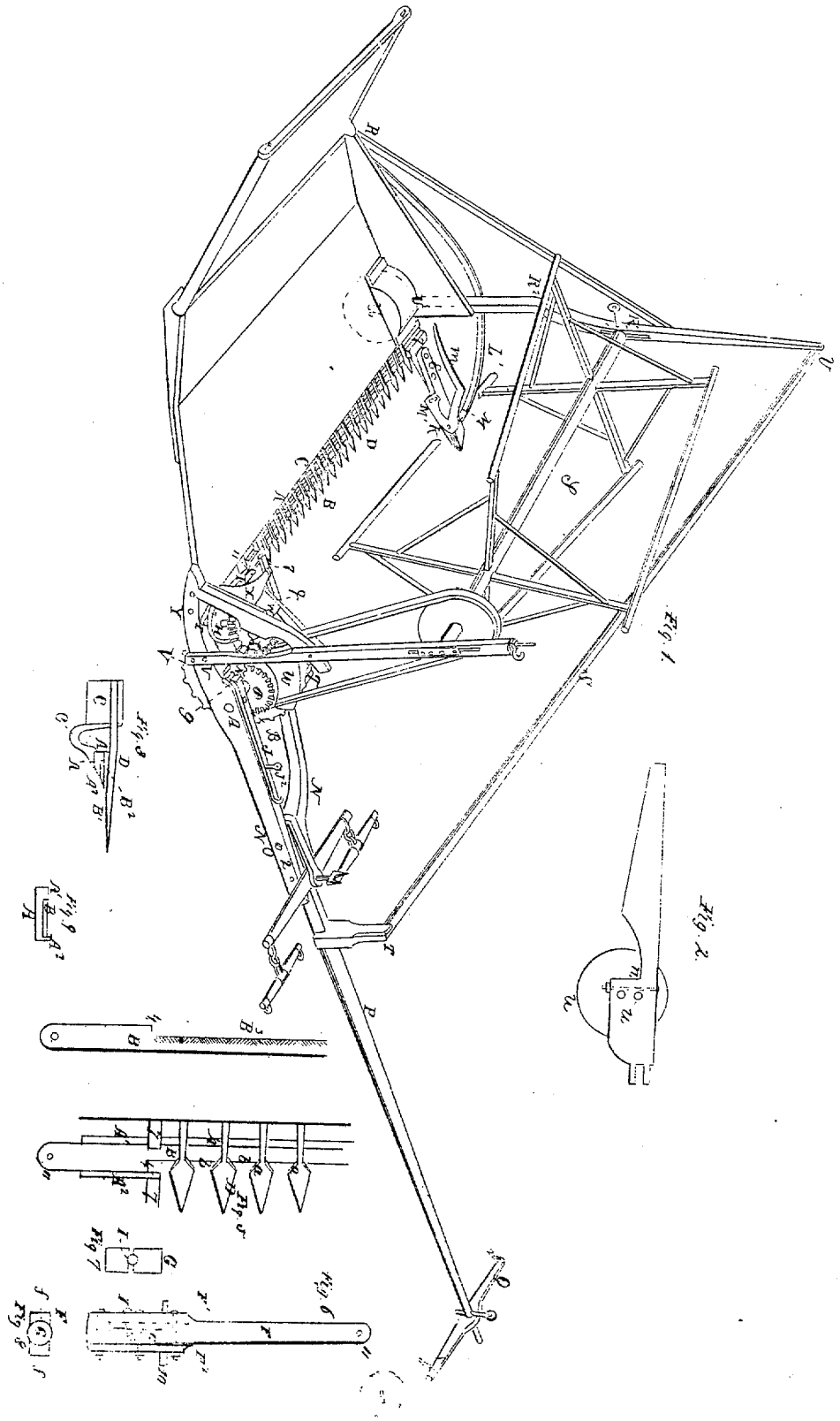

UNITED STATES PATENT OFFICE.

C. H. McCORMICK, OF CHICAGO, ILLINOIS.

IMPROVEMENT IN REAPING-MACHINES.

Specification forming part of Letters Patent No. 3,795, dated January 31, 1845; Reissue No. 578, dated August 3, 1858.

DIVISION A.

*To all whom it may concern:*

Be it known that I, CYRUS H. McCORMICK, of Chicago, in the State of Illinois, have invented certain new and useful Improvements upon my patented Reaping-Machine; and I do hereby declare that the following is a full, clear, and exact description of the construction and operation of the same, reference being had to the annexed drawings, making a part of this specification.

One of the great difficulties which have prevented the successful introduction into use of the reaping-machine has been the want of a method of dividing and separating the grain to be cut from that to be left standing, which would be effective where the grain is lodged or tangled, and until my invention that difficulty had not been overcome. To produce a reaping-machine capable of performing the office of separation between the cut and uncut grain, after a line of division has been marked out, under all circumstances, is the object of my invention; and its principal characteristic feature is the employment of the reel to effect that object, in addition to its other duty of carrying back to the cutters and platform the grain to be cut. In my machine patented in 1834, as in some other machines, the division is effected by a narrow horizontal wedge at the level of the cutting apparatus, in connection with a vertical screen or partition standing on the divider, rising at an angle from the point in advance of the machine, and forming a sort of wall outside of the ends of the reel-ribs for the purpose of separating the grain to be cut from that to be left standing. The effect of this arrangement was that some of the grain which stood inside of the screen, if tangled with that which stood outside of it, was drawn closely against the inside face of the screen, and as the reel-ribs could not be made to traverse close to the inside face of the screen, on account of the necessary frailty and elasticity of a machine, that portion of the grain was liable to be cut at the roots and dragged under the machine or over the side, leaving a trail of cut grain on the ground which was lost. In these machines the presence of the reel-post made it necessary to effect the separation by means of a screen or partition of cloth or other material, for if the grain were tangled and bearing outward it would be dragged down by the reel-post unless separated and kept separate by a screen in advance of it, and therefore it was necessary that the screen should be high and the divider long, for if the heads of grain were above the top of the screen or bar which produced the separation, and were tangled, the vertical post would drag down the stalk when cut, or collect a quantity of grain-stalks upon it, which would clog the operation of the reel, because the separation was made by the advance of the machine itself, and not by the power of the reel. In other machines which had no reels the separation of the cut from the standing grain, when tangled or lodged, if effected at all, was done by the aid of a raker, who with his rake could catch the grain and aid the divider of the machine in an imperfect manner in producing a separation; but my invention has nothing to do with this class of machines.

In considering the problem of effecting a perfect division and separation of tangled and leaning grain by automatic mechanical means, it occurred to me that if a divider could be arranged to run under and so elevate and divide the grain as that the power and backward motion of the reel could be applied to effect the separation a perfect result could be obtained, and I made the combination of parts for carrying out this new mode of operation, the character of which is that after a division-line has been marked out in advance of the machine by a point which projects forward into the grain the diverging lines of the stationary part of the combination so control the stalks which stand on both sides of the division-line that if they are tangled or lodged they will form above and between these diverging lines a hollow arch or open space of sufficient capacity to allow the projecting ends of the reel-ribs to traverse in it far enough to act on the stalks which stand on the inside of the division-line, and by their revolving motion backward to drag them away from their connection with the outside stalks, thus effecting the division by the divider and the forward motion of the machine and the separation by the ends of the reel-ribs and their backward motion.

As the width of the open space between the inner and outer lines of the divider must be sufficient to insure that the projecting ends of the reel-ribs will reach beyond the stalks of grain which are next the cutters, and at the same time not strike the outside stalks and drag them inward, it is desirable that this width should be attained at such a height from the ground that the lateral thrust upon the stalks of grain will not break them down, as it would do if applied on a level nearer the ground, and therefore one or both of the diverging lines must be higher than the cutting apparatus, and it is best to make them both higher and to bring up the inside edge as near the reel as possible, and to cause it to overhang the cutting apparatus some distance. Care should be taken, however, in the formation of the inside line not to make it diverge so far inside of the track of the dividing-point as to throw too much grain between the first pair of fingers of the cutting apparatus, (or first finger and the edge of the divider,) as that would result in choking the cutters at that point, and therefore when the inside line is carried down near the level of the cutters it must only overhang the end of the sickle a small extent at the sickle, although it may swell out to a greater divergence inward from the track of the dividing-point before it reaches the sickle, and at the point where the reel forces the separation. The height of the outside line is best at about two feet from the ground, and of the inside line near the level of the lowest part of the circle of the reel, which is varied in height to suit varying heights of grain, and which may be from two inches to two feet above the cutting apparatus.

It is manifest that in adjusting the height of the inner line of the divider relatively to the height of the reel by which it is to be overlapped a greater width of space must be provided between the two diverging lines of the divider in proportion as the space between the reel and the inner line of the divider may be increased, because the greater the distance between the two diverging lines of the divider the less will be the necessity for having the reel-ribs to work close to the divider, the arch formed by the tangled grain under the action of the divider being increased by the increased width between the two diverging lines of the divider. It is also evident that this separation of the grain by the reel, after it has been divided by the point of the divider, can only be effected when the space between the outside and inside edges of the diverging lines is unobstructed, and therefore that the reel must be supported by some support standing behind its center, and so far back or out of the way as that the straws which are dragged in by the reel will not form a collection against it and obstruct the operation of the machine, and that in proportion as the length of the divider is diminished the reel-post must be further removed out of the way of the grain as it is drawn in by the reel in the act of effecting a separation, because the entire length of the grain which leans over the inside edge of the divider outward must be brought back and swept inward by the power of the reel with a sort of circular motion having the roots of the grain-stalks for its center, and therefore if the reel-post stood within the range of the sweep the grain would strike against it and the operation be impeded.

The accompanying drawings show the construction of the apparatus, by which the division and separation of the grain is effected in the most perfect form I have been able to make it.

On the left side of the machine a piece of scantling, E, projects forward from the end of the sickle at right angles to its line, pointed in front for the purpose of making out the line of division between the cut and uncut grain. At the point of this scantling, at K, is made fast, by a screw-bolt, a bow, L′, of tough wood, the other end of which is made fast in the broader part of the platform at R, and is so bent as to be about two and a half feet high at the left reel-post and about nine inches out from it, with a regular curve.

On the inside of the scantling, and fixed near the point, is an inside iron rod, M, which is so connected to the scantling that it can be raised or depressed and held flat in any desired position within the range which may be given to it by a slot and screw-bolt. This iron, being thus adjustable, may be set so as to be at any height above the cutters which the elevation of the reel will admit, and it is evident that it may be brought down till it nearly touches them. The inside end of this iron is curved, as at M, to suit the reel in one position, and by that means more perfectly controls the grain than if it were straight. The ends of the reel-ribs overlap the inside iron rod, and therefore traverse in the space between it and the outer bow, so that when the machine is at work in tangled or lodged grain, and the inside stalks are drawn outward by the outside ones, the ends of the reel-ribs, moving backward with greater speed than the machine moves forward, seize the inside stalks of grain, and by their power force a separation between the inside and outside stalks of grain.

In order to make the operation of separation effective, it is necessary that there should be no post or other impediment between the inner and the outer lines of the divider, and in advance of where the separation is intended to be effected, because that would impede the separation of the grain, already described, and therefore the support of the reel must be removed from the line of the cutters and placed far enough back of the cutters, or backward and outward, to permit the unobstructed action of the reel-ribs in effecting the separation in the manner described. The reel-post is therefore set at U, and is curved outward at $R^2$, so as to afford the unobstructed open space for the action of the reel-ribs and the grain in being drawn by them onto the platform.

In operating by this method of dividing and separating the grain the best position for the machine to act is to set the dividing-point at the height of the cutters above the ground, whatever that may be, so that the line of division may be straight, and not serpentine, and also the better to run under and raise up the leaning grain than to have it set at a higher level, and then to set the inside edge as near the reel as may be without striking it, thus insuring the best separation by the reel, because no grain can possibly escape when the machine is thus adjusted; but it is obvious that the mode of separation here described does not depend upon the level of the point which traces the division nor upon the aprpoximation of the inside edge to the reel, but upon the relative arrangement of the outside and inside edges with reference to the reel-ribs, so that the open space between them shall be wide enough to enable the reel-ribs to perform the operation of separation, instead of a screen or partition, as previously used.

Besides the dividing apparatus of a reaping-machine, by which the operation of dividing the cut from the uncut grain is performed, there are smaller dividers, commonly called "fingers," whose office it is to divide into smaller parcels the quantity of grain which comes to the cutting apparatus, and these are only large enough to present a quantity to each division of the cutter suitable to be cut, and these fingers or dividers are a part of the cutting apparatus of the machine.

The cutting apparatus consists in so forming the space between the cutter-blade and the fingers that the action of the blade will not drive the grain forward from between the fingers without cutting it. This effect is produced by forming the fingers with a reversed angle at the hinder part, like a spear-head, so that the hinder angle, A, Figure 5, is just behind the serrated edge *b* of the blade B thereof, forming an acute angle between the edge *b* of the blade and the shoulder A of the spear, by which the grain is prevented from yielding to the touch of the blade as it vibrates, when this is combined with the sickle armed with sickle-teeth cut in sections and in reversed directions in alternate sections.

What I claim as my invention, and desire to secure by Letters Patent, is—

The employment of the projecting ends of the reel-ribs to effect the separation of the grain to be cut from that to be left standing, in combination with a dividing apparatus, substantially as described, which effects a division of the grain to be cut from that to be left standing by forming an open space between the outer and inner grain for the ends of the ribs of the reel to act in, in which open space there is no reel-post or other obstruction to prevent the free passage of the grain as it is brought back by the ends of the reel-ribs to the platform of the machine, and by which means a separation of the inside grain to be cut from the outside grain to be left standing is made complete by the action and power of the reel, substantially as described.

C. H. McCORMICK.

Witnesses:
THOMAS C. DONN,
D. WESTERFIELD.